US007938924B2

(12) United States Patent
Lisec

(10) Patent No.: US 7,938,924 B2
(45) Date of Patent: May 10, 2011

(54) METHOD AND APPARATUS FOR SEALING THE CORNER JOINT OF THE SPACER OF AN INSULATING GLASS PANE

(76) Inventor: Peter Lisec, Hausmening-Amstetten (AT)

( * ) Notice: Subject to any disclaimer, the term of this patent is extended or adjusted under 35 U.S.C. 154(b) by 1131 days.

(21) Appl. No.: 11/633,620

(22) Filed: Dec. 5, 2006

(65) Prior Publication Data

US 2007/0131338 A1 Jun. 14, 2007

(30) Foreign Application Priority Data

Dec. 5, 2005 (DE) ......................... 10 2005 058 028

(51) Int. Cl.
*C03C 27/10* (2006.01)

(52) U.S. Cl. ........ 156/107; 156/212; 156/216; 156/505; 156/506

(58) Field of Classification Search .................... 156/99, 156/107, 212, 505, 506, 216
See application file for complete search history.

(56) References Cited

U.S. PATENT DOCUMENTS

| | | | | |
|---|---|---|---|---|
| 3,473,988 | A | 10/1969 | Rullier et al. | |
| 4,789,418 | A * | 12/1988 | Rayl | 156/468 |
| 5,007,217 | A * | 4/1991 | Glover et al. | 52/172 |
| 5,853,828 | A * | 12/1998 | Schimmelpenningh et al. | 428/34 |
| 6,537,406 | B1 * | 3/2003 | Jensen et al. | 156/202 |
| 7,008,492 | B2 | 3/2006 | Lisec | |
| 2002/0057300 | A1 * | 5/2002 | Baker et al. | 347/2 |
| 2003/0178127 | A1 * | 9/2003 | Lisec | 156/109 |

* cited by examiner

*Primary Examiner* — Richard Crispino
*Assistant Examiner* — Christopher Schatz
(74) *Attorney, Agent, or Firm* — Edell, Shapiro & Finnan, LLC

(57) ABSTRACT

In order to seal the corner joint of an elastoplastic tape placed as a spacer on a glass pane, a film strip is pressed with a first portion of its length against the first leg section of the spacer and the protruding portion of the film strip is wrapped around the corner and pressed against the second leg section. For the purpose of automating this process, the film strip is severed mechanically from an automatically supplied film tape and held via a transfer apparatus which thereafter presses the film strip with the first portion of its length against the first leg section. The portion of the film strip protruding freely over the corner is wrapped around the corner via a pressure carriage and pressed by tautening against the second leg section of the spacer.

14 Claims, 6 Drawing Sheets

METHOD AND APPARATUS FOR SEALING THE CORNER JOINT OF THE SPACER OF AN INSULATING GLASS PANE

CROSS REFERENCE TO RELATED APPLICATIONS

This application claims priority under 35 U.S.C. §119 to Application No. DE 102005058028.9 filed on Dec. 5, 2005, entitled "A Method and Apparatus for Sealing the Corner Joint of the Spacer of an Insulating Glass Pane," the entire contents of which are hereby incorporated by reference.

BACKGROUND

It is known that insulating glass panes need to be sealed so as to be resistant against diffusion of water vapor. For this purpose, a permanently plastic adhesive, which usually is butyl, is applied to both lateral sides of the spacer. In the case of a spacer made of an elastoplastic tape which often consists of several functional layers and is gas-diffusion-tight, a joint is produced inevitably between the "beginning" and the "end" of the tape placed on the one glass pane. Spacers placed or applied mechanically frequently start and end in the region of a corner of the respective glass pane because the mechanical transport processes of the glass pane will be simplified. To ensure that diffusion tightness is also ensured in the area of this so-called corner joint, a film strip made of plastic for example is currently glued onto the corner by hand.

SUMMARY

The invention relates to a method and an apparatus for sealing the corner joint of an elastoplastic tape placed on a glass pane as a spacer by pressing an oblong film strip which is adhesive on one side with a width which is substantially equal to the width of the elastoplastic tape against the leg sections of the spacer converging in the corner joint, with the film strip being pressed with a first portion of its length against the first leg section and the portion which at first protrudes freely beyond the corner is wrapped around the corner and pressed against the second leg section. As a result, the last gap is thus virtually closed in the otherwise fully automated production process of insulating glass panes in a long production line, which starts with the raw glass panel and ends with the insulating glass pane ready for shipment.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

The method according to the invention and the apparatus for carrying out the method are explained below by reference to an embodiment and the schematically simplified drawings.

DETAILED DESCRIPTION

FIGS. 1 to 6*b* show the relevant parts of an apparatus for the automatic placement of an adhesive film strip on the corner joint of the spacer placed on two glass panes. The apparatus is integrated in a known line for the automated production of insulating glass panes and is arranged for example directly after an apparatus for applying an elastoplastic tape as a spacer known for example from DE-B-102 12 359. When the glass panes are conveyed and processed, as is currently customary, in an upright manner (but slightly inclined against the vertical line), the present corner sealing apparatus is mounted in its entirety on a carriage which is guided in the longitudinal direction on a pillar and is positioned via the data of the respective glass pane supplied by the machine control system in such a way that the corner sealing apparatus is aligned towards the corner joint before the apparatus starts to work.

Figure 1:
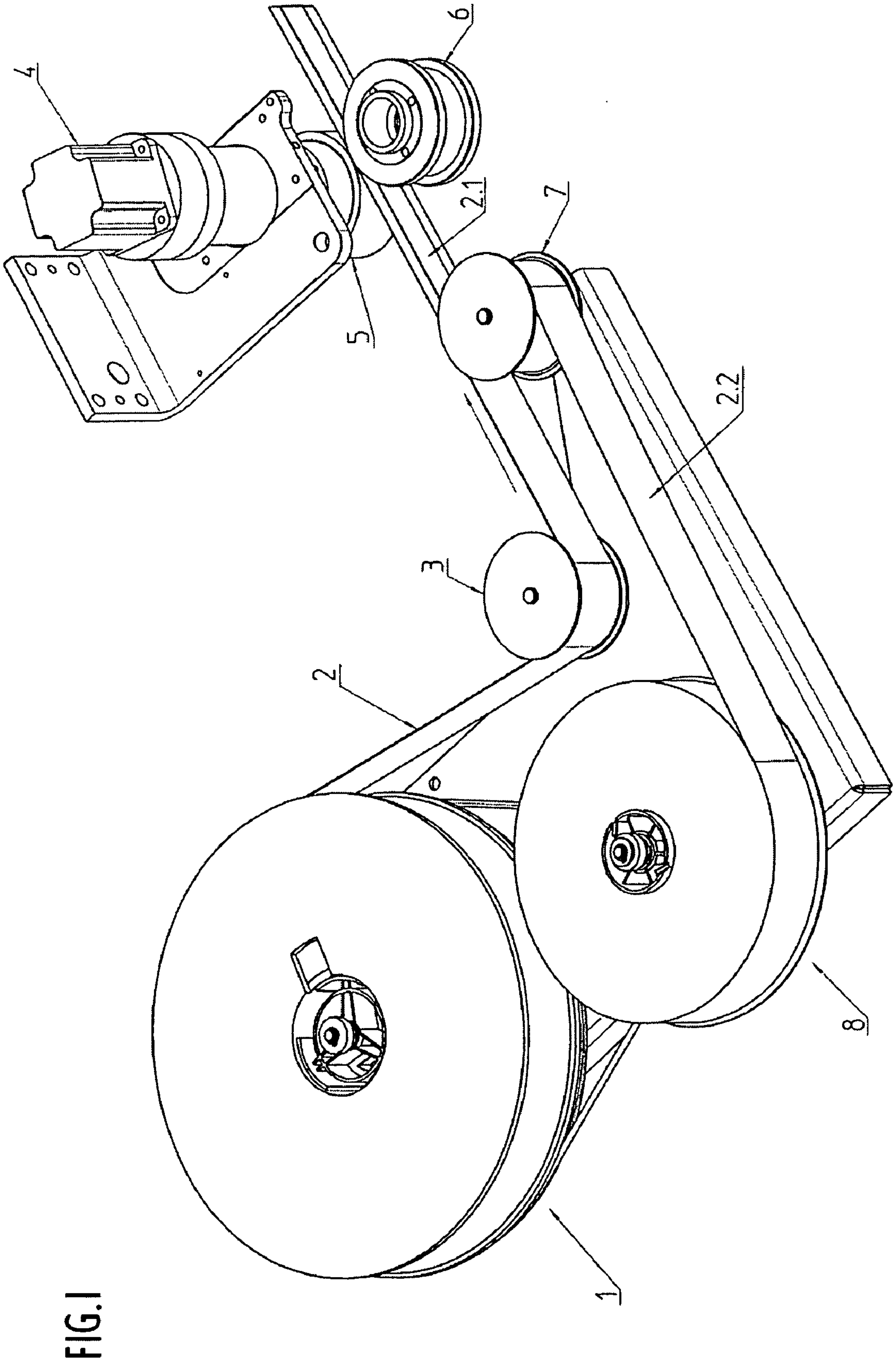
FIG. 1 shows a perspective top view of a film tape feed.

FIG. 1 shows a supply reel 1, from which a film strip 2 can be withdrawn via a deflection roller 3 and two conveyor rollers 5 and 6 driven by a stepper motor 4. The film strip can comprise plastic, especially of a multi-layer composite plastic with at least one diffusion-tight layer, or of a metal, e.g. an aluminum foil or a foil made of stainless steel or a metal/plastic composite film. The film strip 2 comprises on one side a layer 2.1 made of a polymerizing adhesive, e.g., including acrylate and/or butyl. An adhesive layer is especially advantageous which includes a middle strip that comprises butyl and one acrylate-based adhesive strip each on either side of the same. The adhesive layer 2.1 exposes an upper and lower edge strip of the strip 2. The conveyor roller touches only the strip 2 in the area of the adhesive-free edge strip. The adhesive side of the strip 2 is covered by a protective film 2.2 which is pulled off during the withdrawal of the strip 2 via a deflection roller 7 and is wound up on a disposal roller 8. According to a further development which is not shown, a middle strip of tenacious butyl is applied via a nozzle onto the layer 2.1 on the basis of acrylate after the withdrawal of the protective film 2.2.

Figure 2A:
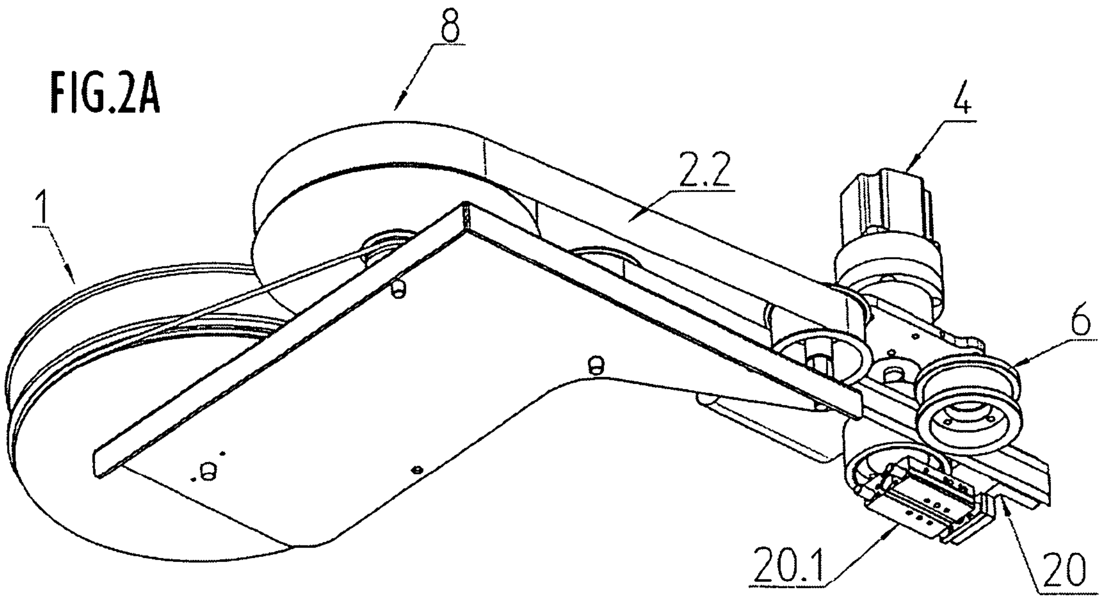
FIG. 2*a* shows the respective perspective bottom view, supplemented by a number of further parts.
Figure 2B:
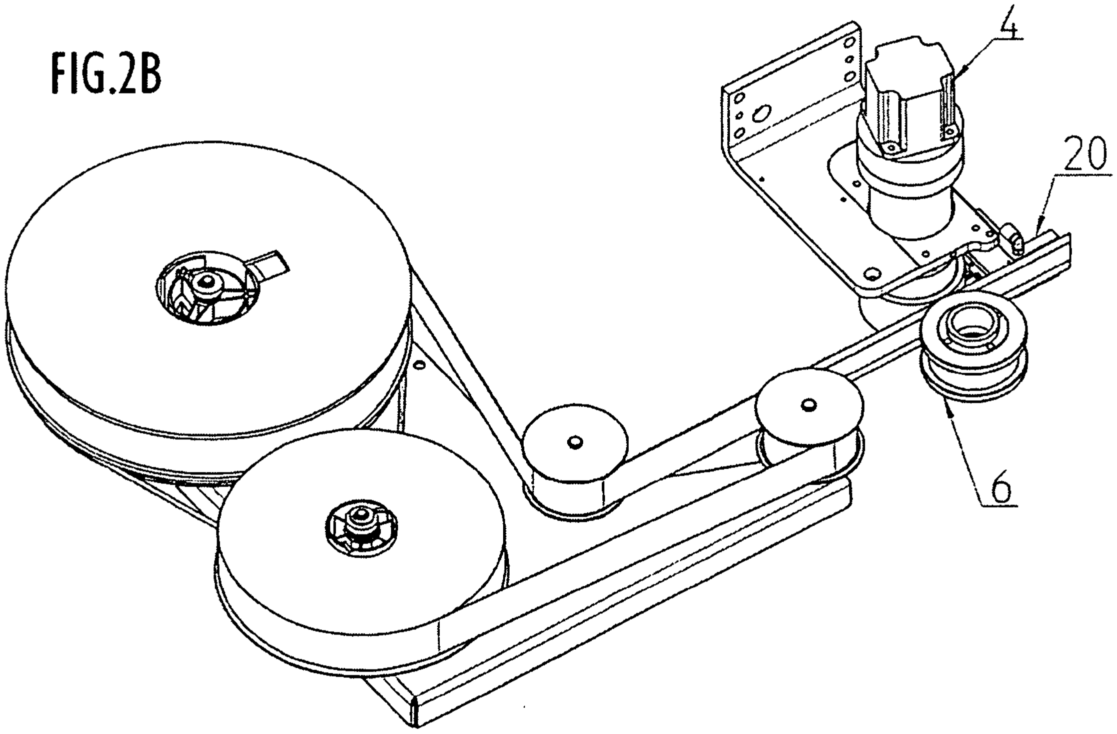
FIG. 2*b* shows the respective view obliquely from above.

FIGS. 2*a* and 2*b* show the partial apparatus in FIG. 1 in an oblique bottom view and an oblique top view, each supplemented by a jaw 20 which follows the conveyor rollers 5, 6 and is displaceable via a compressed air cylinder 20.1 in the conveying direction of the strip (see arrow in FIG. 1) and is part of a subsequently described clamping apparatus.

Figure 3:
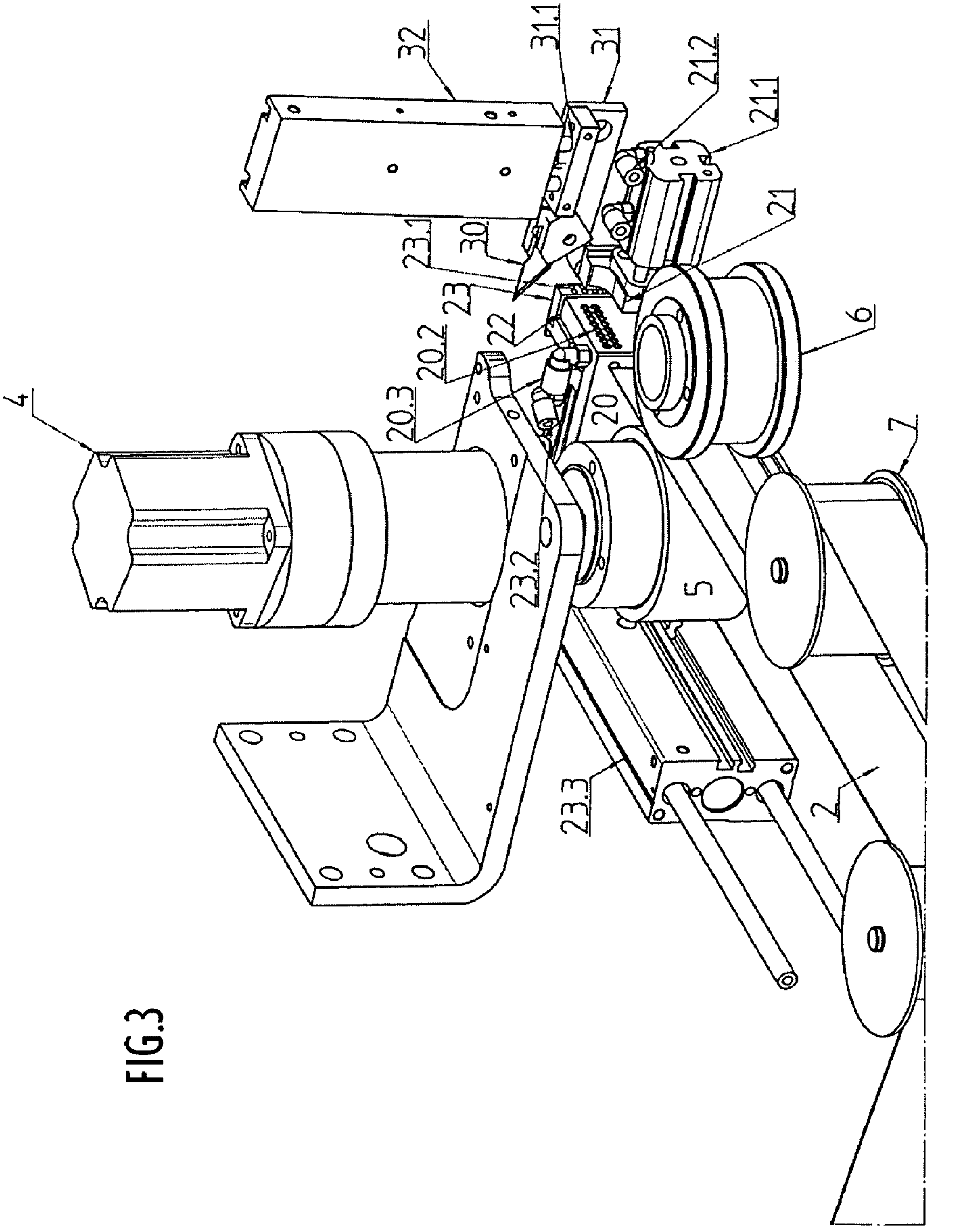
FIG. 3 shows the part of the apparatus adjacent to FIG. 1, especially the clamping and cutting apparatus.

As shown in FIG. 3, the synchronously driven conveyor rollers 5, 6 (e.g., via a toothed belt) convey the strip 2, which is shown here for the purpose of better clarity only until shortly after the conveyor rollers 5, 6, between the jaws 20, 21 of a clamping apparatus. Jaw 20 comprises numerous suction bores 20.2 in its strip contact surface situated in the strip transport plane and a suction air connection 20.3. Jaw 21 is displaceable from the illustrated position at a right angle to the strip transport plane via a working cylinder 21.1 with indicated compressed air connections 21.2. In the forward position the jaw 21 holds the strip 2 via plastic buffers (not shown in this view) against the respective contact surface of the jaw 20. The buffers are situated at the level of the adhesive-free edge strips of the strip 2. The suction bores 20.2 of the jaw 20 ensure that the strip which is not clamped over its entire surface remains crease-proof during the subsequent transport process.

A transfer apparatus 23 follows the clamp 20 in the direction of the strip transport, which transfer apparatus is spaced from the jaw 20 via a continuous slot 22. The transfer apparatus 23 also comprises suction bores 23.1 in its strip contact surface and a respective suction air connection 23.2. It is displaceable via a compressed air drive 23.3 in the strip transport direction.

A knife 30 is aligned towards the slot 22 which is situated at the end of a knife carrier 31 which on its part is downwardly displaceable from the illustrated idle position for severing a film strip from the strip 2. For this purpose, the knife carrier 31 is connected via guide rods 31.1 with a compressed air drive 32.

Figure 4:
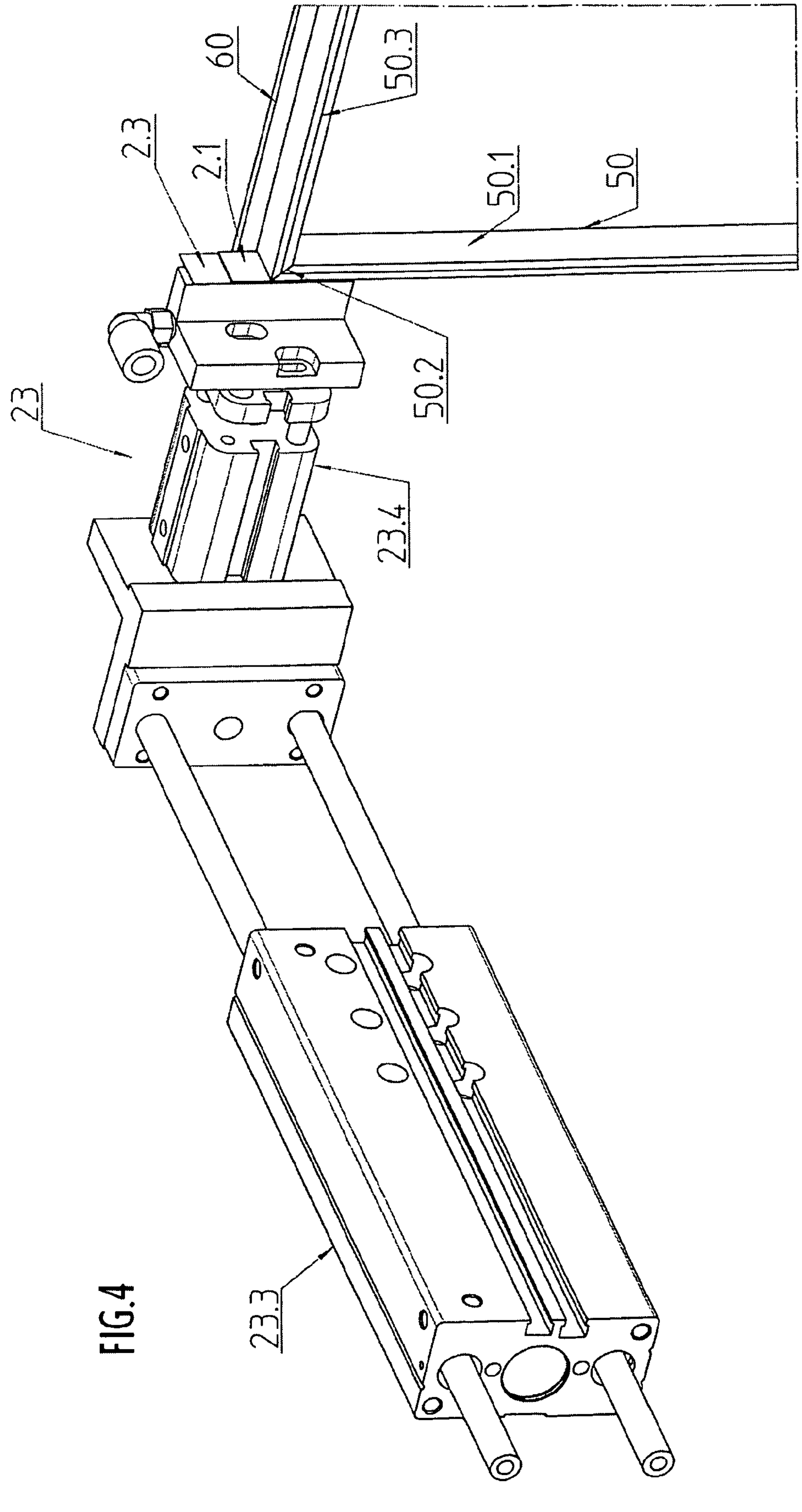
FIG. 4 shows the transfer apparatus for the film tape in the advanced position in which it presses the film strip against the one leg section of the spacer.

The film strips are produced as follows: while the transfer apparatus 23 is situated in the position as shown in FIG. 4, the stepper motor 4 in FIG. 3 slides the strip over the transport rollers 5 and 6 in the transport direction by the width of the film strip to be produced, which width is predetermined by the machine control unit. The jaw 20 which is subjected in the meantime to a negative pressure holds the end section of the strip which reaches up to the slot 22 and is sucked against the strip contact surface and is advanced in the strip transport direction synchronously to the strip transport via the compressed air cylinder 20.1 (shown in FIG. 2*a*) by at least the width of the film strip in order to keep the strip taut. As already mentioned, the transfer apparatus 23 has been advanced in the meantime via the cylinder of drive 23.3 in FIG. 3 into the plane of the glass pane 60 (cf. FIG. 4). After the negative pressure has been removed, the jaw 20 moves back to the position as shown in FIG. 3 and also the transfer apparatus 23. The strip contact surface both of the clamp 20 and the transfer apparatus 23 is subjected to a negative pressure. At the same time, the clamp 21 moves in the direction of clamp 20 until there is contact of the plastic buffers with the edges of the strip 2. In the next step the knife 30 severs a film strip from the strip 2 which now adheres to the strip contact surface of the transfer apparatus 23. The knife 30 and the clamp 21 then return to their illustrated initial positions.

FIG. 4 shows a glass pane 60 on which a spacer 50 has been placed so as to adhere with its one lateral surface. The spacer 50 comprises a corner joint 50.2 between its vertical leg 50.1 and its horizontal leg 50.3. The corner joint is to be sealed via the severed film strip 2.3 in a diffusion-tight manner. The glass pane 60 rests as usual with its surface averted from the spacer 50 against a supporting wall (not shown), but it could also lie on a horizontal table surface.

In the next step, the transfer apparatus 23 with the severed and sucked-in film strip is advanced via the cylinder 23.3 to the position as shown in FIG. 4 rectangular to the plane of the positioned glass pane 60 and thereafter displaced via a cylinder 23.4 in the direction of the leg 50.1 of the spacer 50, so that the film strip 2.3 adheres with its lower section of its adhesive layer 2.1 on the leg 50.1.

The width of the surface of the transfer apparatus 23 which holds the film strip 2.3 in a sucked manner is at most equal to the width of the narrowest spacer 50, so that the apparatus can also be used for lager widths without exchanging the transfer apparatus. In the example of FIG. 4, the width of the spacer is larger than the width of the above surfaces of the transfer apparatus.

Figure 5A:
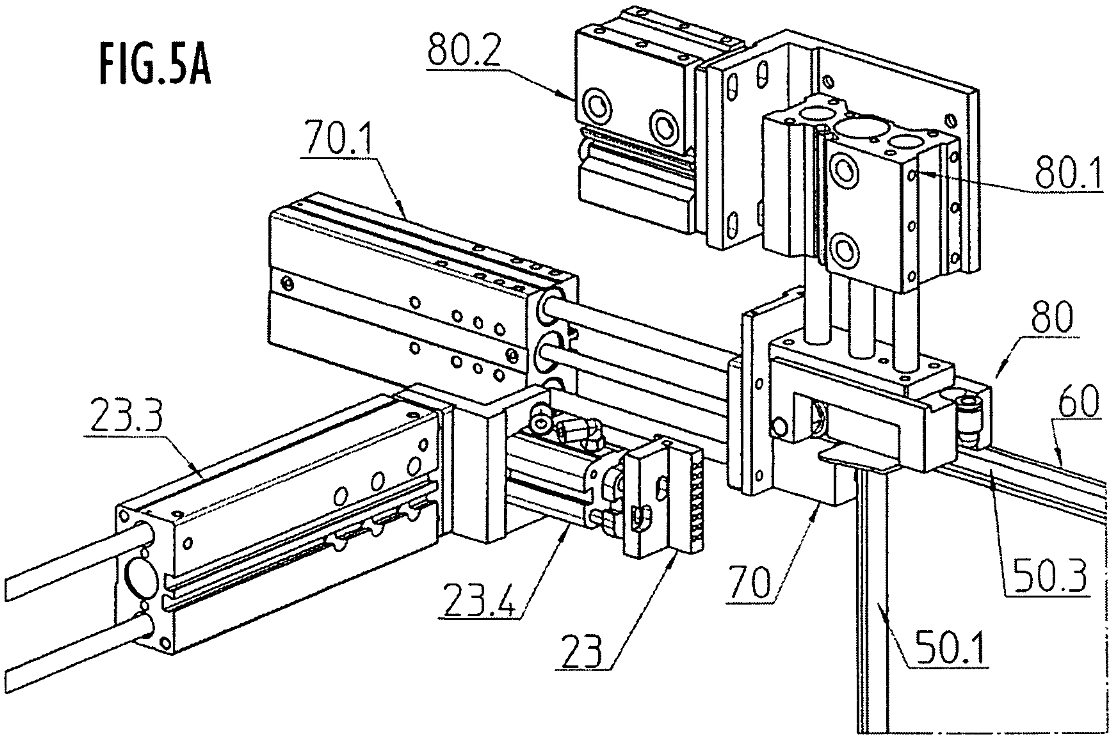
FIG. 5*a* shows the situation similar to FIG. 4, but with retracted transfer apparatus and supplemented by a pressing apparatus for the first part of the film strip and a pressure carriage for turning and pressing the part of the film strip previously protruding freely over the spacer corner.
Figure 5B:
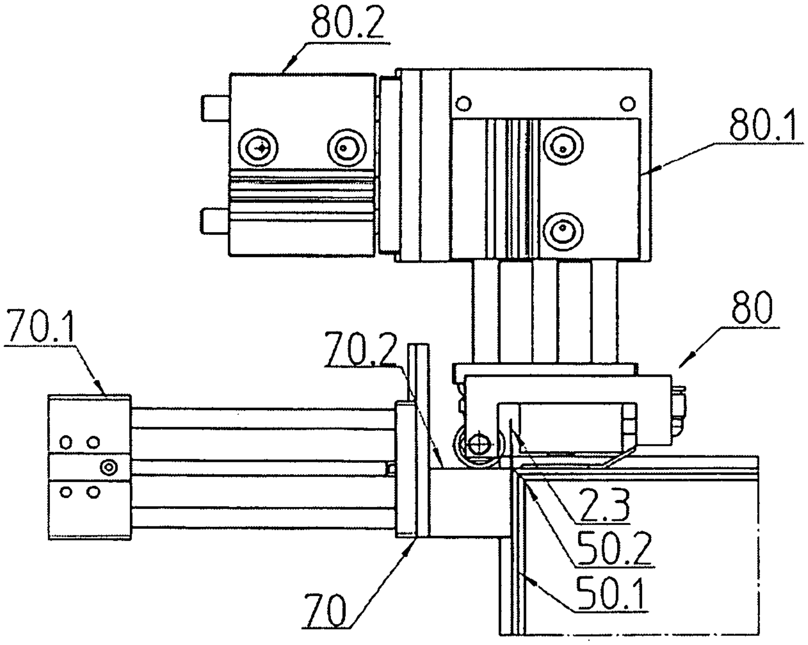
FIG. 5*b* shows the parts shown in FIG. 5*a* in a top view.

Because the transfer apparatus protrudes upwardly beyond the corner joint 50.2 according to the length of the film strip 2.3 and in order to ensure pressing over the entire surface of the film strip against the vertical leg 50.1, the entire apparatus according to FIGS. 5*a* and 5*b* comprises a pressure apparatus 70 whose pressure surface is at least equal to the width of the widest used spacer.

In the step as shown in FIGS. 5*a* and 5*b*, the transfer apparatus 23 is retracted to its initial position (as shown in FIG. 3). It has thus created space for the pressure apparatus 70 which has been omitted in the preceding Figs. for reasons of improved illustration and which is advanced via a compressed air cylinder 70.1 to the respective position which previously was assumed by the transfer apparatus 23 (see FIG. 4). As is shown in FIG. 5*b*, the pressure apparatus 70 therefore presses the respective (lower) section of the film strip against the leg 50.1 of the spacer. The upper surface 70.2 of the pressure apparatus 70 is in alignment with the upper or outer surface of the leg 50.3 of the spacer 50. A pressure carriage 80 is situated above the pressure apparatus 70, but in the same plane as the same. It is displaceable vertically by a cylinder 80.1 and horizontally by a cylinder 80.2 and is used to wrap the part of the film strip 2.3 which previously protruded freely over the corner joint 50.2 about the corner and to press the same against the leg section 50.3 of the spacer 50.

Figure 6B:
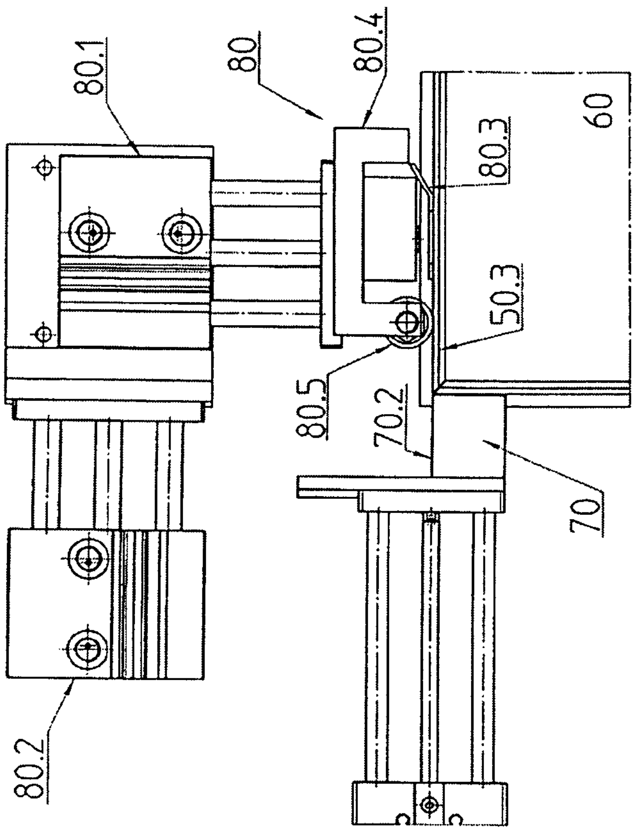
FIG. 6*b* shows the parts shown in FIG. 6*a* in a top view.
Figure 6A:
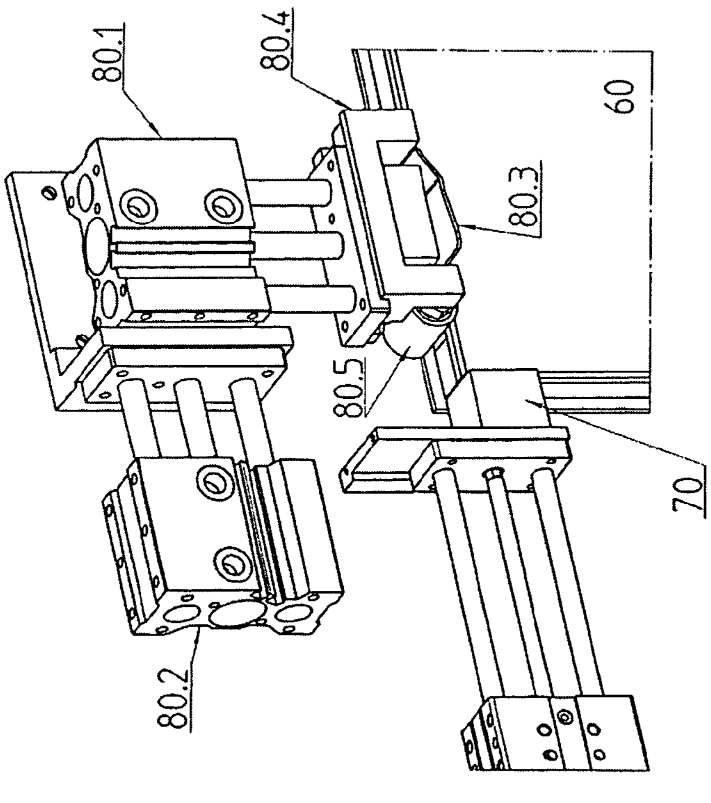
FIG. 6*a* shows the pressure apparatus and the pressure carriage directly before the turning of the film strip about the spacer corner.

According to FIGS. 6*a* and 6*b*, the pressure carriage 80 comprises a smoothing plate 80.3 for this purpose which can be lowered onto the leg 50.3 via compressed air cylinder (not shown) arranged in a carriage body 80.4 and is bent in the manner of a skid at its end preceding in the direction of movement. The smoothing plate 80.3 compresses at first the corner joint 50.2 during the lowering to an unavoidable residual gap and smoothes the outer surface of the spacer leg 50.3 in the course of the horizontal displacement via the cylinder 80.2. Moreover, the pressure carriage 80 comprises a pressure roller 80.5 which trails with respect to the smoothing plate 80.3, which pressure roller, in the course of the displacement of the pressure carriage 80 via cylinder 80.2, performs at first the wrapping of the portion of the film strip 2.3 protruding over the edge and then its taut rolling against the leg 50.3.

With the pressing of the two sections of the film strip 2.3 against the respective leg sections, the surface areas 2.1 (see FIG. 4) which are acrylic for example being to polymerize and thus ensure that after the placement of the glass pane (not shown) and the further known production steps the inner space of the finished insulating glass pane is gas-tight also in the area of the corner 50.2 and especially remains sealed so as to be prevent diffusion of water vapor. Especially favorable results are achieved when the adhesive 2.1 comprises a central strip comprising butyl which then lies precisely over the corner joint and overlaps the corner.

After the step shown in FIGS. 6*a* and 6*b*, the described parts return to their respective initial position, so that after the removal of the glass pane 60 and the delivery of the next glass pane and the new position of the described entire apparatus in case of a different pane format the corner joint of the spacer of the next glass pane can be sealed.

Having described exemplary embodiments of the invention, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for sealing a corner joint of an elastoplastic tape placed on a glass pane as a spacer, the spacer having first and second leg sections that converge in a corner joint, the method comprising:

orienting the glass pane including the corner joint proximate a sealing apparatus, the sealing apparatus including a transfer apparatus, a pressure apparatus, and a pressure carriage;

mechanically severing a film strip from an automatically supplied film tape held on a jaw of a clamping apparatus disposed upstream from the transfer apparatus, the film strip including adhesive on one side and having a width which is substantially equal to a width of the elastoplastic tape;

transferring the film strip to the first leg section via the transfer apparatus such that a first portion of the film strip adheres to the first leg section and a second portion of the film strip protrudes freely beyond the corner joint, the transfer apparatus thereafter releasing the film strip;

contacting the first portion of the film strip with the pressure apparatus to press the first portion of the film strip against the first leg section;

contacting the second portion of the film strip with the pressure carriage to wrap the second portion of the film strip around the corner joint; and pressing the second portion of the film strip against the second leg section of the spacer with the pressure carriage.

2. The method according to claim 1, wherein the first portion of the film strip is pressed via the pressure apparatus against the first leg section of the spacer while the pressure carriage wraps the second portion of the film strip and presses the second portion against the second leg section.

3. The method according to claim 1, wherein:

the sealing apparatus further comprises a smoothing plate, and the method further comprises contacting the corner joint with the smoothing plate prior to the pressing of the second portion of the film strip to press the second leg section of the spacer against the first leg section in order to reduce any gap of the corner joint existing between the first and second leg sections of the spacer.

4. The method according to claim 1, wherein:

the sealing apparatus further comprises a pressure roller; and the method further comprises rolling the second portion of the film at least once against the second leg section of the spacer.

5. The method according to claim 1, wherein:

the sealing apparatus further comprises:

a knife disposed between the clamping apparatus and the transfer apparatus; and the method further comprises:

holding the film tape on a jaw of a clamping apparatus upstream of the transfer apparatus;

advancing the jaw in a transport direction of the film tape by a path equal to the width of the spacer;

releasing the film tape from the jaw, the jaw being returned to an initial position jointly with the transfer apparatus;

holding the film tape in the clamping apparatus and on the transfer apparatus; and severing the film strip via a knife displaceable at a right angle to the film tape transport direction.

6. The method according to claim 5, wherein the film tape in the clamping apparatus and the film strip on the transfer apparatus are held before and after the severing from film tape via negative pressure.

7. The method according to claim 1 further comprising applying a strip of butyl onto the adhesive side of the film tape prior to severing the film strip.

8. The method according to claim 1, wherein a butyl adhesive is applied to the corner joint prior to the pressing of the film strip.

9. The method according to claim 1, wherein the transfer apparatus releases the film strip before the second portion of the strip is wrapped around the corner joint.

10. The method according to claim 1, further comprising moving the pressure carriage in the same plane as the pressure apparatus.

11. The method according to claim 1, wherein the transfer apparatus releases the film strip before the pressure apparatus contacts the first portion of the strip.

12. A method for sealing a corner joint of an elastoplastic tape placed on a glass pane as a spacer, the spacer having first and second leg sections that converge to form a corner joint, the method comprising:

(a) orienting a glass pane including the corner joint proximate a sealing apparatus, the sealing apparatus including:

a supply reel for holding a film tape including adhesive on one side and having a width which is substantially equal to a width of the elastoplastic tape, a controlled tape drive for withdrawing the film tape from the supply reel, a clamping apparatus for securing the film tape, the clamping apparatus including a jaw, a severing device for severing a section of the film tape from the supply reel to form a film strip, a pressure carriage, and a transfer apparatus configured to position the severed film strip with respect to the corner joint of the spacer;

(b) holding the film tape on the jaw of the clamping apparatus, the clamping apparatus disposed upstream from the transfer apparatus;

(c) mechanically severing the film tape with the severing device to form the film strip;

(d) transferring the film strip to the corner joint with the transfer apparatus such that a first portion of the film strip adheres to the first leg section of the spacer and a second portion of the film strip protrudes freely beyond the corner joint;

(e) disengaging the transfer apparatus from the film strip attached to the corner joint; and (f) wrapping the second portion of the film strip around the corner joint and pressing the second portion of the film strip against the second leg section of the spacer.

13. The method according to claim 12, wherein:

the sealing apparatus further comprises a pressure apparatus;

(e) further comprises contacting the first portion of the film strip with the pressure apparatus to press the first portion of the film strip against the first leg section; and (f) further comprises contacting the second portion of the film strip with the pressure carriage to wrap the second portion of the film strip around the corner joint and to press the second portion of the film strip against the second leg section of the spacer.

14. A method for sealing a corner joint of an elastoplastic tape placed on a glass pane as a spacer, the spacer having first and second leg sections that converge in a corner joint, the method comprising:

orienting the glass pane including the corner joint proximate a sealing apparatus, the sealing apparatus including a transfer apparatus, a pressure apparatus, a pressure carriage, a clamping apparatus with a jaw disposed upstream of the transfer apparatus, and a knife disposed between the clamping apparatus and the transfer apparatus;

holding the film tape on the jaw of the clamping apparatus upstream of the transfer apparatus;

mechanically severing a film strip from an automatically supplied film tape held by the transfer apparatus, the film strip including adhesive on one side and having a width which is substantially equal to a width of the elastoplastic tape;

transferring the film strip to the first leg section via the transfer apparatus such that a first portion of the film strip adheres to the first leg section and a second portion of the film strip protrudes freely beyond the corner joint, the transfer apparatus thereafter releasing the film strip;

contacting the first portion of the film strip with the pressure apparatus to press the first portion of the film strip against the first leg section;

contacting the second portion of the film strip with the pressure carriage to wrap the second portion of the film strip around the corner joint; and pressing the second portion of the film strip against the second leg section of the spacer with the pressure carriage, wherein the method further comprises:

advancing the jaw in a transport direction of the film tape by a path equal to the width of the spacer;

releasing the film tape from the jaw, the jaw being returned to an initial position jointly with the transfer apparatus;

holding the film tape in the clamping apparatus and on the transfer apparatus; and severing the film strip via the knife, the knife being displaceable at a right angle to the film tape transport direction.

* * * * *